United States Patent [19]

Daems

[11] Patent Number: 5,334,624
[45] Date of Patent: Aug. 2, 1994

[54] POLYOL COMPOSITIONS

[75] Inventor: Diana M. F. Daems, Kortenberg, Belgium

[73] Assignee: Imperial Chemical Industries PLC, London, England

[21] Appl. No.: 163,467

[22] Filed: Dec. 6, 1993

[30] Foreign Application Priority Data

Dec. 23, 1992 [GB]  United Kingdom ............. 9226868.9

[51] Int. Cl.[5] .............................................. C08G 18/14
[52] U.S. Cl. ................................. 521/130; 521/131; 252/182.24; 252/182.27
[58] Field of Search ............................. 521/130, 131; 252/182.24, 182.27

[56] References Cited

U.S. PATENT DOCUMENTS

| | | | |
|---|---|---|---|
| 4,760,099 | 7/1988 | Canaday et al. | 521/110 |
| 5,032,623 | 7/1991 | Keske et al. | 521/131 |
| 5,112,878 | 5/1992 | Wishneski et al. | 521/131 |
| 5,137,929 | 8/1992 | Demmin et al. | 521/99 |
| 5,147,898 | 9/1992 | Saito | 521/131 |
| 5,194,175 | 3/1993 | Keske et al. | 252/182.25 |

OTHER PUBLICATIONS

*Neutralized or Blocked Catalysts for Polyurethane Foam Blown With HCFC-22*, 772/Research Disclosure, Oct. 1991, vol. 330.

*Primary Examiner*—Maurice J. Welsh

[57] ABSTRACT

Polyol blends containing HCFC-22 and basic catalyst, stabilized by the presence of an acid-ended polyester having a molecular weight in the range 300 to 3000 and an acid value in the range 5 to 100 mg KOH/g.

11 Claims, No Drawings

POLYOL COMPOSITIONS

This invention relates to polyol compositions useful in the preparation of polyurethane and urethane-modified polyisocyanurate foams, to a process for the preparation of such foams, and to the foams prepared thereby.

The production of cellular polyurethane and urethane-modified polyisocyanurate materials by the reaction of a polyisocyanate and a polyol in the presence of a blowing agent is well known. The rate and other characteristics of the reaction may be greatly influenced by incorporation into the reaction mixture of a catalyst. In industrial practice, catalysts to be used in the production of polyurethane and urethane-modified polyisocyanurate foams are selected from the wide range known in the art according to the particular reaction profile which is appropriate to the application for which the foam is to be produced. Amongst the many catalysts which are known, the most commonly used are basic materials, in particular tertiary amines and the alkali or alkaline earth metal salts of carbonic and carboxylic acids.

A class of materials which has been widely used as blowing agent in the production of polyurethane and urethane-modified polyisocyanurate foams is the chlorofluorocarbons, and in particular trichlorofluoromethane (CFC-11). Recent concern over the potential of chlorofluorocarbons to cause depletion of ozone in the atmosphere has led to the need to develop reaction systems in which chlorofluorocarbon blowing agents are replaced by alternative materials which are environmentally acceptable and which also produce foams having the necessary properties for the many applications in which foams are used. One suitable alternative blowing agent which does not show the level of ozone depletion observed for chlorofluorocarbons and which can be used in reaction systems producing foams having advantageous properties for a range of applications is chlorodifluoromethane (HCFC-22).

It is convenient in many applications to provide the components for polyurethane production in pre-blended formulations based on each of the primary polyisocyanate and polyol components. In particular, many reaction systems employ a polyol formulation which contains the major additives such as the blowing agent and the catalyst in addition to the polyol component or components.

Such formulations should be stable during storage over a protracted period. It is found that formulations comprising HCFC-22 and basic catalysts are less stable than similar formulations containing CFC-11, leading to unacceptably short storage lives and a need for critical storage conditions. The degradation of the formulations, which is believed to result from the breakdown of HCFC-22 under basic conditions, also leads to the production of corrosive by-products which may cause damage to storage containers, and can cause deterioration in the properties of foam products prepared from the formulations.

The use of acid-blocked or neutralised catalysts in polyol compositions containing HCFC-22 and the resultant improvement in storage stability are disclosed in U.S. Pat. No 5,112,878 and in Research Disclosure Number 33054, Volume 330, Page 772 (1991). In both of these disclosures the use of simple organic and inorganic acids as agents to block or neutralise the basic character of amine and metal carboxylate salts is described, leading to an improvement in storage characteristics.

Although improved storage characteristics are observed in polyol formulations incorporating HCFC-22 and blocked or neutralised basic catalysts, the presence of simple organic or inorganic acid residues leads to a change with increasing storage time in the reaction profile when the polyol is reacted with a polyisocyanate component to produce a foam. In particular the time at which the reaction mixture changes from a fluid to a cross-linked mass (the 'gel time') tends to increase with increasing storage age of such polyol compositions. Such inconsistencies in reaction profile resulting solely from the storage age of the polyol composition are undesirable in large scale manufacturing processes where consistency and repeatability are essential for efficient and problem-free foam production. Furthermore, the use of simple acid derivatives as stabilisers means addition of a supplemental component to the foam formulation which may have its influence on other characteristics. For example, it is known that in the production of polyisocyanurate foams the addition of certain acids leads to inhibition of the trimerisation reaction.

Further development by the present Applicant has led to the production of novel polyol compositions containing HCFC-22 and basic catalysts which are stabilised without the use of simple organic and inorganic acids as blocking or neutralising agents, thereby avoiding the disadvantages noted above.

Accordingly, the invention provides a polyol composition comprising a basic catalyst and chlorodifluoromethane, characterised in that the polyol composition further comprises an acid-ended polyester having a molecular weight in the range 300 to 3000 and an acid value in the range 5 to 100 mg KOH/g.

The improvement in storage stability resulting from the use of such an acid-ended polyester is comparable to the storage stability resulting from the use of organic and inorganic acids as stabilisers. But no inconsistencies in reaction profile are observed. Further these acid-ended polyesters being isocyanate-reactive components are more compatible with the existing foam formulations. Especially if they also exhibit hydroxyl functionalities they can be regarded as a substituent for some or all of the polyol components and thus not as an additional foam formulation component.

The chemical nature of the acid-ended polyester is not critical. Any polyester product of a polyacid and a polyol which has a molecular weight within the range 300 to 3000 (preferably within the range 500 to 2500, most preferably within the range 1000 to 1500) and which has an acid value in the range 5 to 100 mg KOH/g (preferably in the range of 30 to 90 mg KOH/g, most preferably in the range 50 to 85 mg KOH/g) is suitable. Examples of suitable polyesters include the reaction products of a stoichiometric excess of a diacid with a diol. Suitable diacids include adipic acid, glutaric acid, succinic acid, phthalic acid, terephthalic acid, and any mixture of two or more such acids, including the mixtures of adipic, succinic and glutaric acid known as AGS acids. Suitable diols include alkylene glycols such as ethylene glycol, propylene glycol and butylene glycol, and oligomeric polyalkylene glycols such as diethylene glycol, higher molecular weight polyethylene glycols, dipropylene glycol, higher molecular weight polypropylene glycols, and mixtures thereof. Acid-ended polyesters having a functionality of greater than 2 may also be used, such as those obtained by the reaction of polyacids with one or more polyols having more than two hydroxy groups per molecule, such as glycerol, sorbitol and pentaerythritol. The polyester may also exhibit hydroxyl functionality in addition to acid functionality.

The acid-ended polyester content of the polyol compositions according to the invention is dependent upon the application for which the polyol composition is to be used. In the case of polyol compositions for use in the preparation of urethane-modified polyisocyanurate foams, the acid-ended polyester content is suitably within the range 0.5 to 100 parts by weight per 100 parts by weight of total composition, and preferably in the range 2 to 50 parts by weight. In the case of polyol compositions for use in the preparation of polyurethane foams the acid-ended polyester content is suitably in the range 2 to 20 parts by weight per 100 parts by weight of total composition, and preferably in the range from 2 to 10 parts by weight.

The chlorodifluoromethane content of the polyol compositions according to the invention will depend upon the particular application for which the foam is intended, but will normally be within the range from 2 to 25 parts by weight per 100 parts by weight of total composition.

The polyol compositions of the invention will normally comprise one or more polyol components in addition to the acid-ended polyester and chlorodifluoromethane, and, optionally, further additives commonly used in the art such as foam stabilisers, fire retardants, surfactant materials, crosslinking agents etc. However, where the acid-ended polyester also exhibits hydroxyl functionality, it may serve as the sole polyol component in the compositions according to the invention, particularly in the case of polyol compositions intended for the preparation of urethane-modified polyisocyanurate foams, Where additional polyol components are present in the polyol compositions according to the invention, they are suitably present in an amount in the range from 5 to 100 parts by weight per 100 parts by weight of total composition.

The basic catalysts which may be comprised in the polyol compositions according to the invention include any of those basic materials well known in the art as suitable for catalysing the formation of polyurethane or urethane-modified polyisocyanurate foams, and include tertiary amines and the alkali or alkaline earth metal salts of carbonic and carboxylic acids. Suitable tertiary amines include dimethylcyclohexylamine, trimethylamine, triethylamine, triethylenediamine, N-alkylmorpholines such as N-methylmorpholine, tertiary arylamines such as dimethylbenzylamine, tertiary amines derived from ethylenediamine such as tetramethyl tetraethylenediamine, tertiary aminoalkyl ethers such as bis-(2-dimethylaminoethyl) ether, N,N-dialkylalkanolamines, tertiary amines derived from 1,3-propanediamine, tertiary amines derived from 1,4-butanediamine, tertiary amines derived from 1,6-hexanediamine, and N-alkylimidazoles. Suitable alkali or alkaline earth metal salts of carbonic and carboxylic acids include the sodium and potassium salts of acetic acid and 2-ethylhexanoic acid. The catalyst content of the polyol compositions of the invention will depend upon the particular application, but will typically be in the range from 0.1 to 10 parts by weight per 100 parts by weight of total composition.

Where the polyol compositions are intended for use in the preparation of rigid polyurethane or urethane-modified polyisocyanurate foams, suitable additional polyols are those having average hydroxyl numbers in the range from 300 to 1000 mg KOH/g, especially in the range from 300 to 700 mg KOH/g, and a hydroxyl functionality in the range from 2 to 8, especially in the range from 3 to 8. Such polyols for rigid foam preparation are well known in the art and include especially the polyether reaction products of alkylene oxides, such as ethylene oxide and propylene oxide, with initiators containing from 2 to 8 active hydrogens per molecule. Suitable initiators include polyols, for example glycerol, trimethylolpropane, triethanolamine, pentaerythritol, sorbitol and sucrose, polyamines such as ethylene diamine, tolylene diamine, diaminodiphenylmethane and polymethylene polyphenylene polyamines, and aminoalcohols such as ethanolamine and diethanolamine, as well as mixtures of such initiators. Other polymeric polyols include hydroxyl terminated polythioethers, polyamides, polyesters, polycarbonates, polyacetals, polyolefins and polysiloxanes.

Where the polyol compositions are intended for use in the preparation of flexible foams, suitable additional polyols are those having a molecular weight in the range from 1000 to 10000, preferably from 1500 to 7500, and a number average functionality in the range from 2 to 4. Such polyols for flexible foam preparation are well known in the art and include especially the polyether reaction products of alkylene oxides, such as ethylene oxide and propylene oxide, with initiators containing from 2 to 4 active hydrogens per molecule. Suitable initiators include water and polyols such as ethylene glycol, propylene glycol and their oligomers, glycerol, trimethylolpropane, triethanolamine, polyamines such as ethylene diamine, tolylene diamine, diaminodiphenylmethane and polymethylene polyphenylene polyamines, and aminoalcohols such as ethanolamine and diethanolamine, as well as mixtures of such initiators. Other polymeric polyols include hydroxyl terminated polythioethers, polyamides, polyesters, polycarbonates, polyacetals, polyolefins and polysiloxanes. Polyol compositions suitable for the preparation of integral skin foams and microcellular elastomers will generally contain a mixture of high molecular weight polyols such as those mentioned above for flexible foams and lower molecular weight isocyanate-reactive compounds having a molecular weight in the range from 60 to 1000 such as simple diols, for example ethylene glycol, propylene glycol, dipropylene glycol, tripropylene glycol and 1,4-butanediol, simple hydroxyamino compounds such as ethanolamine, diethanolamine and propanolamine, and simple polyamines such as diethyl toluenediamine and low molecular weight amino-ended polyethers.

The polyol compositions of the invention may be used in the preparation of polyurethane or polyisocyanurate foams by reaction with any of the polyisocyanates commonly used in the art, optionally in the presence of further components commonly used in the art such as foam stabilisers, fire retardants, surfactant materials, cross-linking agents etc. Accordingly, in a further aspect, the invention provides a process for the preparation of a polyurethane or urethane-modified polyisocyanurate foam which comprises reaction of a polyol composition and a polyisocyanate under foam-forming conditions, wherein the polyol composition comprises a basic catalyst and chlorodifluoromethane, characterised in that the polyol composition further comprises an acid-ended polyester having a molecular weight in the range 300 to 3000 and an acid value in the range 5 to 100 mg KOH/g. In operating the process of the invention the known, one-shot, full prepolymer or semiprepolymer techniques may be used together with conventional mixing methods and the foams and elastomers may be prepared in the form of mouldings, cavity fillings, sprayed foam, frothed foam or slab stock foams.

Polyisocyanates which may be used in the process for polyurethane or urethane-modified polyisocyanurate foam preparation according to the present invention include aliphatic, cycloaliphatic, araliphatic and aromatic polyisocyanates as proposed in the literature for use generally in the production of rigid foams. Of particular importance are aromatic diisocyanates such as tolylene and diphenylmethane diisocyanate in the well known pure, modified and crude forms, in particular the so-called MDI variants (diphenylmethane diisocyanate modified by the introduction of urethane, allophanate, urea, biuret, carbodiimide, uretonimine or isocyanurate residues) and the mixtures of diphenylmethane diisocyanate(s) and oligomers thereof known in the art as "crude" or "polymeric" MDI (polymethylene polyphenylene polyisocyanates). Preferred polyisocyanates for the preparation of rigid polyurethane and urethane-modified polyisocyanurate foams are those having an average nominal functionality of 2.4–3.0 and in particular of 2.4–2.9. Preferred polyisocyanates for the preparation of flexible and integral skin foams and for microcellular elastomers are those having an average nominal functionality of 2.0 to 2.4.

Additional blowing agents may be used to supplement the blowing action of HCFC-22 in the process of the invention. Such blowing agents may be carbon dioxide–evolving compounds, or inert low boiling compounds having a boiling point of above −70° C. at atmospheric pressure. Where water is used as blowing agent, the amount may be selected in known manner to provide foams of the desired density, typical amounts being in the range from 0.05 to 5% by weight based on the total reaction system. Suitable inert blowing agents, include those well known and described in the art, for example hydrocarbons, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers. Preferred additional blowing agents for use in the process of the present invention are water and those physical blowing agents having boiling points between −70° C. and +15° C. at atmospheric pressure, and more preferably between −70° C. and +5° C. at atmospheric pressure.

In a further embodiment of the invention, the polyol compositions of the invention comprise an additional blowing agent as described herein.

The various aspects of this invention are illustrated, but not limited by the following examples.

The following formulation and reaction components are referred to in the examples:

Polyol A:
A polyether polyol of hydroxyl value 500 mg KOH/g

Polyol B:
A polyether polyol of hydroxyl value 440 mg KOH/g

Polyol C:
A polyester polyol of hydroxyl value 360 mg KOH/g

Acid-ended Polyester D: An acid-ended polyester derived from adipic acid and diethylene glycol, of molecular weight 1000 and having an acid value of 55–60 mg KOH/g.

Acid-ended Polyester E:
An acid-ended polyester derived from adipic acid and diethylene glycol, of molecular weight 1500 and having an acid value of 84 mg KOH/g.

Acid-ended Polyester F:
An acid-ended polyester derived from adipic acid and diethylene glycol, of molecular weight 3000 and having an acid value of 11 mg KOH/g.

Suprasec DNR:
Polymeric MDI having an NCO content of 30.7% (from Imperial Chemical Industries PLC)

Tegostab B8404 and Tegostab B8406:
A silicone surfactant from Goldschmidt

Catalyst SFC:
A tertiary amine catalyst from Imperial Chemical Industries PLC.

Niax A1:
A tertiary amine catalyst from Union Carbide

HCFC-22:
chlorodifluoromethane (blowing agent)

HCFC-142b:
chlorodifluoroethane (blowing agent)

EXAMPLE 1

The degradation of HCFC-22 in a polyol blend containing Polyol B, HCFC-22, a basic catalyst (Catalyst SFC), and a variable amount of Acid-ended Polyester D, was monitored by determination of the free chloride ion content after storage for 2 weeks. Chloride ion content was measured by titration against silver nitrate solution.

The composition of the polyol blends (parts by weight) and the free chloride ion concentration after storage for 2 weeks (%) are given in Table 1:

TABLE 1

| Polyol B | 100 | 99.5 | 99 | 98 | 95 | 90 |
|---|---|---|---|---|---|---|
| Acid-ended Polyester D | 0 | 0.5 | 1 | 2 | 5 | 10 |
| Water | 4.5 | 4.5 | 4.5 | 4.5 | 4.5 | 4.5 |
| B8404 | 2 | 2 | 2 | 2 | 2 | 2 |
| HCFC-22 | 12.6 | 12.6 | 12.6 | 12.6 | 12.6 | 12.6 |
| Chloride ion after 2 weeks (%) | 0.09 | 0.06 | 0.05 | 0.04 | 0.035 | 0.03 |

The results given in Table 1 demonstrate a significant reduction in HCFC-22 degradation in the blends containing the acid-ended polyester stabilising agent.

EXAMPLE 2

The effect of acid-ended polyesters on the stability of polyol blends was determined by monitoring the content of free chloride ion (according to the method of Example 1) over a period of 5 weeks (storage at 48° C.). After the storage period, the polyol blends were reacted with Suprasec DNR under standard foam forming conditions, and the characteristics of the foam-forming reaction profiles and the texture of the resultant foams were determined. Table 2 records the free chloride ion content of the blends after storage and prior to reaction with the polyisocyanate (determined by titration with silver nitrate solution), the string time also called gel time (time taken for the reaction mixture to reach the transition point from fluid to cross-linked mass), the foam texture, and the average cell diameter of the foam.

Gel times were assessed visually by use of a probe inserted into and withdrawn from the foaming mixture. Final foam textures were assessed on a scale of 1 to 9 by comparison with reference samples, and the average cell diameters assigned to the foams are those measured for the reference sample having the same foam texture value.

EXAMPLE 3

The effect of acid-ended polyesters on the long-term stability of polyol blends was determined according to the methods described in Example 2 (storage at room temperature). Results are given in Table 3.

TABLE 2

|  | Unit |  |  |  |  |  |  |
|---|---|---|---|---|---|---|---|
| Polyol A | pbw | 45 | 45 | 45 | 45 | 45 | 45 |
| Polyol B | pbw | 45 | 45 | 45 | 45 | 45 | 45 |
| Polyol C | pbw | 10 | — | — | — | 10 | — |
| Acid-ended Polyester D | pbw | — | 10 | — | — | — | 10 |
| Polyester E | pbw | — | — | 10 | — | — | — |
| Polyester F | pbw | — | — | — | 10 | — | — |
| Tegostab 8404 | pbw | 2 | 2 | 2 | 2 | 2 | 2 |
| Water | pbw | 3.6 | 3.6 | 3.6 | 3.6 | 3.6 | 3.6 |
| Catalyst SFC | pbw | 2.7 | 2.7 | 2.7 | 2.7 | 2.7 | 2.7 |
| HCFC-22 | pbw | 12.56 | 12.56 | 12.56 | 12.56 | 5.04 | 5.04 |
| HCFC-142b | pbw | — | — | — | — | 7.56 | 7.56 |
| Niax Al | pbw | — | — | — | — | 0.1 | 0.1 |
| Suprasec DNR | pbw | 192 | 192 | 150 | 150 | 192 | 192 |
| INITIAL RESULTS | | | | | | | |
| String Time | sec | 31 | 48 | 53 | 42 | 32 | 44 |
| Foam Texture | scale 1-9 | 3 | 3 | 2 | 2 | 2 | |
| Average Cell Diameter | mm | 0.18 | 0.18 | 0.18 | 0.11 | 0.11 | 0.11 |
| Free Chloride ion | % | 0.002 | 0.002 | 0.002 | 0.002 | 0.001 | 0.0009 |
| Acid value | mg KOH/g | 0.23 | 5.40 | 7.2 | 1.2 | 0.3 | 5.2 |
| 2 WEEKS BLEND STORAGE | | | | | | | |
| String Time | sec | 46 | 51 | 59 | 52 | 36 | 43 |
| Foam Texture | scale 1-9 | 9 | 3 | 2-3 | 9 | 2-3 | 2 |
| Average Cell Diameter | mm | 0.85 | 0.18 | 0.11-0.18 | | 0.11-0.18 | 0.11 |
| Free Chloride ion | % | 0.130 | 0.056 | 0.038 | 0.095 | 0.059 | 0.022 |
| Acid Value | mg KOH/g | 2.4 | 5.4 | 8.8 | 4.4 | 2.5 | 5.6 |
| 5 WEEKS BLEND STORAGE | | | | | | | |
| String Time | sec | collapse | | | | 42 | 44 |
| Foam Texture | scale 1-9 | — | | | | 4 | 3 |
| Average Cell Diameter | mm | — | | | | 0.23 | 0.18 |
| Free Chloride ion | % | 0.220 | 0.11 | 0.081 | 0.180 | 0.097 | 0.048 |
| Acid Value | mg KOH/g | 8.3 | 9.0 | 10.2 | 7.2 | 4.5 | 6.6 |

TABLE 3

|  |  |  |  |  |  |
|---|---|---|---|---|---|
| Polyol A | pbw | — | — | 45.0 | 45.0 |
| Polyol B | pbw | 100.0 | 90.0 | 45.0 | 45.0 |
| Polyol C | pbw | — | — | 10.0 | — |
| Acid-Ended Polyester D | pbw | — | 10.0 | — | 10.0 |
| Tegostab B8404 | pbw | 2.0 | 1.5 | — | — |
| Tegostab B8406 | pbw | — | — | 2.0 | 2.0 |
| Water | pbw | 4.6 | 4.6 | 3.6 | 3.6 |
| Catalyst SFC | pbw | 2.6 | 2.6 | 2.7 | 2.7 |
| HCFC-22 | pbw | 12.56 | 12.56 | 12.56 | 12.56 |
| Niax Al | pbw | — | — | 0.1 | 0.1 |
| Suprasec DNR | pbw | 192.0 | 177.3 | 150.0 | 150.0 |
| INITIAL RESULTS | | | | | |
| String Time | sec | 64 | 103 | 30 | 46 |
| Foam Texture | scale 1-9 | 6 | 6 | 2 | 2 |
| Free Chloride Ion | % | — | <0.001 | 0.002 | 0.002 |
| Acid Value | mg KOH/g | — | 5.3 | 0.24 | 5.3 |
| 7 WEEKS BLEND STORAGE | | | | | |
| String Time | sec | 66 | 103 | 32 | 45 |
| Foam Texture | scale 1-9 | 6 | 6 | 2 | 2 |
| Free Chloride Ion | % | — | 0.004 | 0.032 | 0.008 |
| Acid Value | mg KOH/g | — | 5.0 | 1.3 | 5.2 |
| 21 WEEKS BLEND STORAGE | | | | | |
| String Time | sec | 80 | 116 | 36 | 46 |
| Foam Texture | scale 1-9 | 7 | 6-7 | 3 | 2-3 |
| Free Chloride Ion | % | 0.052 | 0.009 | 0.054 | 0.017 |
| Acid Value | mg KOH/g | 0.9 | 5.2 | 2.2 | 5.6 |
| 28 WEEKS BLEND STORAGE | | | | | |
| String Time | sec | collapse | 105 | 35 | 45 |
| Foam Texture | scale 1-9 | — | 6-7 | 3 | 2-3 |

| | | | | | |
|---|---|---|---|---|---|
| TABLE 3-continued | | | | | |
| Free Chloride Ion | % | 0.058 | 0.010 | 0.060 | 0.020 |
| Acid Value | mg KOH/g | 1.1 | 5.3 | 2.5 | 5.6 |
| 52 WEEKS BLEND STORAGE | | | | | |
| String Time | sec | — | 108 | 39 | 45 |
| Foam Texture | scale 1-9 | — | 9 | 3-4 | 3-4 |
| Free Chloride Ion | % | — | 0.015 | 0.089 | 0.034 |
| Acid Value | mg KOH/g | — | 5.5 | 3.9 | 6.3 |

EXAMPLE 4

As a comparison the effect of simple organic acids on stability of polyol blends was determined according to the methods described in Example 2 (storage at 48° C.). The acids were used in the same molar amount as the acid-ended polyester D in the previous examples. Results are given in Table 4. The results given in Table 4 show that addition of simple acids yields comparable improvements in stability (see Example 3). But reaction profiles become inconsistent.

Further several of these acids show other further disadvantages: solubility problems with oxalic acid and adipic acid; discoloration with formic acid.

TABLE 4

| | | | | | | |
|---|---|---|---|---|---|---|
| Polyol A | pbw | 45 | 45 | 45 | 45 | 45 |
| Polyol B | pbw | 45 | 45 | 45 | 45 | 45 |
| Polyol C | pbw | 10 | 10 | 10 | 10 | 10 |
| Formic acid | pbw | 0.46 | — | — | — | — |
| Acetic acid | pbw | — | 0.60 | — | — | — |
| Octanoic acid | pbw | — | — | 1.44 | — | — |
| Oxalic acid | pbw | — | — | — | 0.45 | — |
| Adipic acid | pbw | — | — | — | — | 0.73 |
| Water | pbw | 3.6 | 3.6 | 3.6 | 3.6 | 3.6 |
| SFC | pbw | 2.7 | 2.7 | 2.7 | 2.7 | 2.7 |
| B8404 | pbw | 2.0 | 2.0 | 2.0 | 2.0 | 2.0 |
| HCFC-22 | pbw | 12.56 | 12.56 | 12.56 | 12.56 | 12.56 |
| DNR | pbw | 150 | 150 | 150 | 150 | 150 |
| INITIAL RESULTS | | | | | | |
| String Time | sec | 41 | 42 | 40 | 52 | 40 |
| Foam Texture | scale 1-9 | 2 | 2 | 2 | 2 | 2 |
| Free Chloride Ion | % | 0.001 | 0.002 | 0.001 | <0.001 | 0.001 |
| Acid Value | mg KOH/g | 4.7 | 4.8 | 4.9 | 5.1 | 4.7 |
| 1 WEEK BLEND STORAGE | | | | | | |
| String Time | sec | 49 | 45 | 46 | 54 | 45 |
| Foam Texture | scale 1-9 | 2-3 | 2-3 | | | |
| Free Chloride Ion | % | 0.026 | 0.027 | 0.029 | 0.021 | 0.031 |
| Acid Value | mg KOH/g | 5.5 | 5.7 | 5.9 | 5.8 | 5.8 |
| 2 WEEKS BLEND STORAGE | | | | | | |
| String Time | sec | 49 | 53 | 48 | 62 | 48 |
| Foam Texture | scale 1-9 | 2-3 | 3 | 5 | 2-3 | 2-3 |
| Free Chloride Ion | % | 0.045 | 0.051 | 0.049 | 0.045 | 0.054 |
| Acid Value | mg KOH/G | 6.3 | 6.7 | 6.8 | 6.5 | 6.9 |
| 5 WEEKS BLEND STORAGE | | | | | | |
| String Time | sec | 58 | 57 | 58 | 68 | 57 |
| Foam Texture | scale 1-9 | >>9 | >9 | >>>9 | >>9 | >>>9 |
| Free Chloride Ion | % | 0.098 | 0.096 | 0.098 | 0.088 | 0.097 |
| Acid Value | mg KOH/G | 8.4 | 8.8 | 8.9 | 8.0 | 8.7 |

I claim:

1. Polyol composition comprising a basic catalyst and chlorodifluoromethane, characterised in that the polyol composition further comprises an acid-ended polyester having a molecular weight in the range 300 to 3000 and an acid value in the range 5 to 100 mg KOH/g.

2. Polyol composition according to claim 1 wherein the acid ended polyester is the reaction product of a stoichiometric excess of a diacid with a diol.

3. Polyol composition according to claim 2 wherein the diacid is adipic acid, glutaric acid, succinic acid, phthalic acid, terephthalic acid, or any mixture of two or more thereof, and the diol is an alkylene glycol, an oligomeric polyalkylene glycol or any mixture of two or more thereof.

4. Polyol composition according to claim 3 wherein the diacid is adipic acid, glutaric acid, succinic acid, phthalic acid, terephthalic acid, or any mixture of two or more thereof, and the diol is ethylene glycol or diethylene glycol.

5. Polyol composition according to claim 1 wherein the acid-ended polyester content is within the range from 0.5 to 100 parts by weight per 100 parts by weight of total composition.

6. Polyol composition according to claim 1 wherein the chlorodifluoromethane content is within the range from 2 to 25 parts by weight per 100 parts by weight of total composition.

7. Polyol composition according to claim 1 wherein the catalyst content is within the range from 0.1 to 10 parts by weight per 100 parts by weight of total composition.

8. Polyol composition according to claim 1 wherein the basic catalyst is a tertiary amine or the alkali or alkaline earth metal salt of a carbonic or a carboxylic acid.

9. Polyol composition according to claim 1 wherein the acid-ended polyester also exhibits hydroxyl functionality.

10. Process for the preparation of a polyurethane or urethane-modified polyisocyanurate foam which comprises reaction of a polyol composition and a polyisocyanate under foam-forming conditions, wherein the polyol composition comprises a basic catalyst and chlorodifluoromethane, characterised in that the polyol composition further comprises an acid-ended polyester having a molecular weight in the range 300 to 3000 and an acid value in the range 5 to 100 mg KOH/g.

11. Polyurethane or urethane-modified polyisocyanurate foam prepared according to the process of claim 10.

* * * * *